United States Patent Office 3,352,305
Patented Nov. 14, 1967

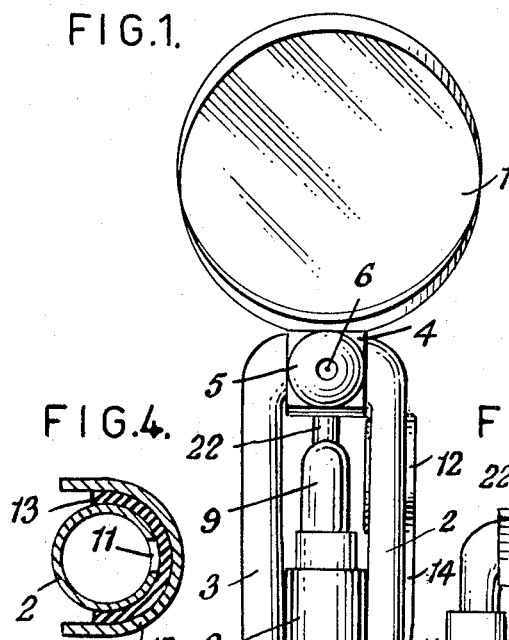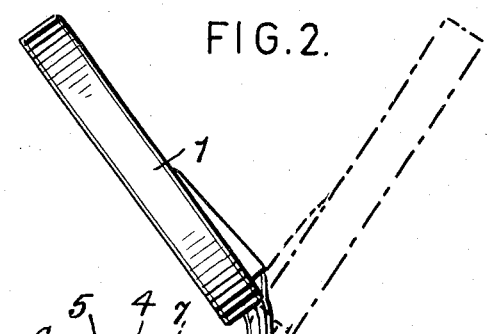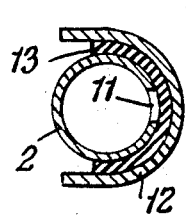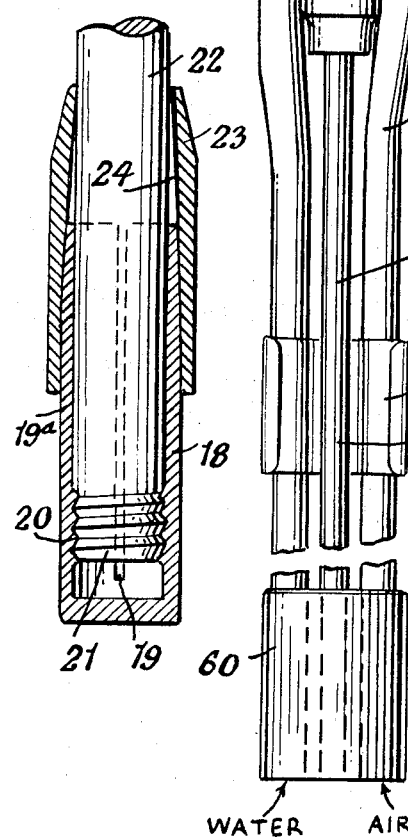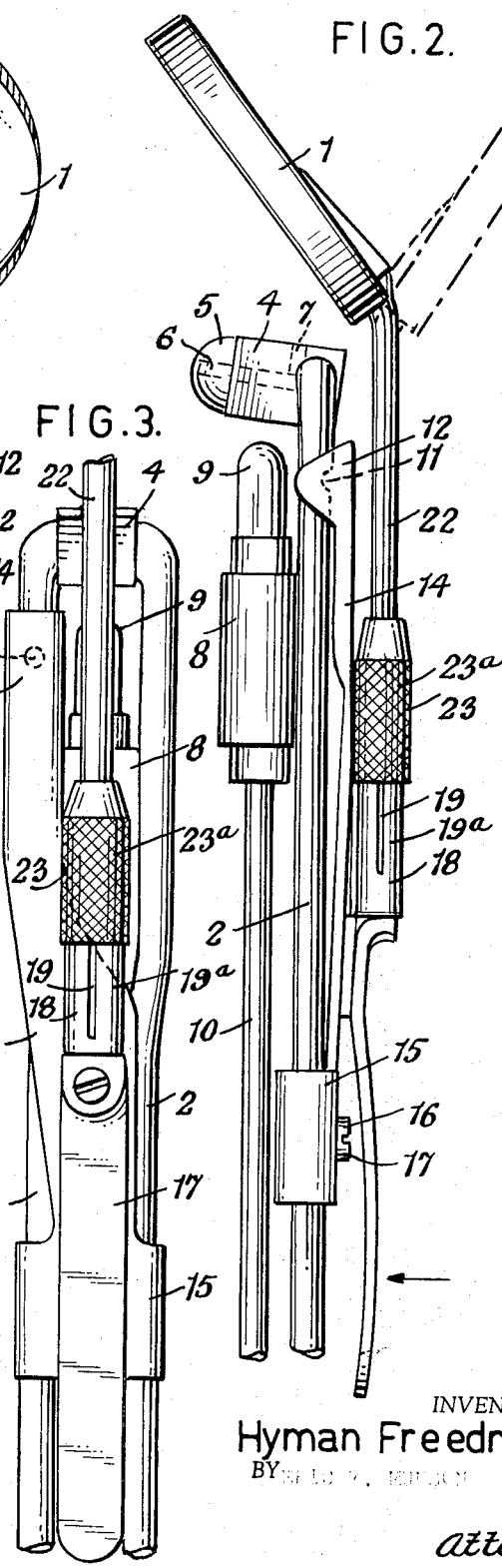

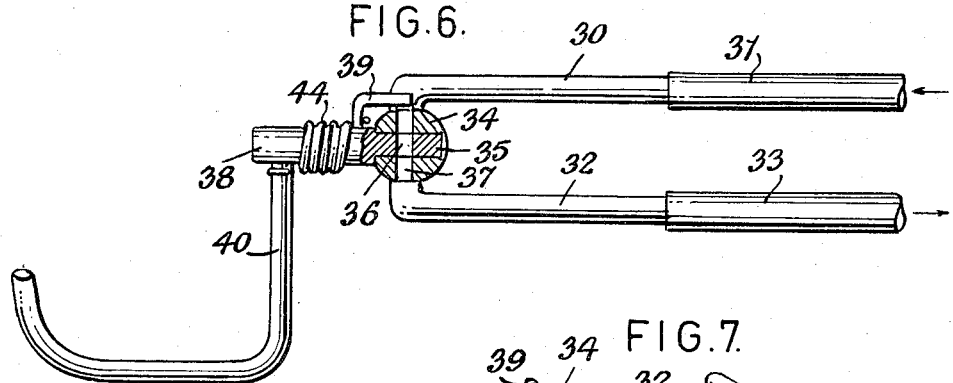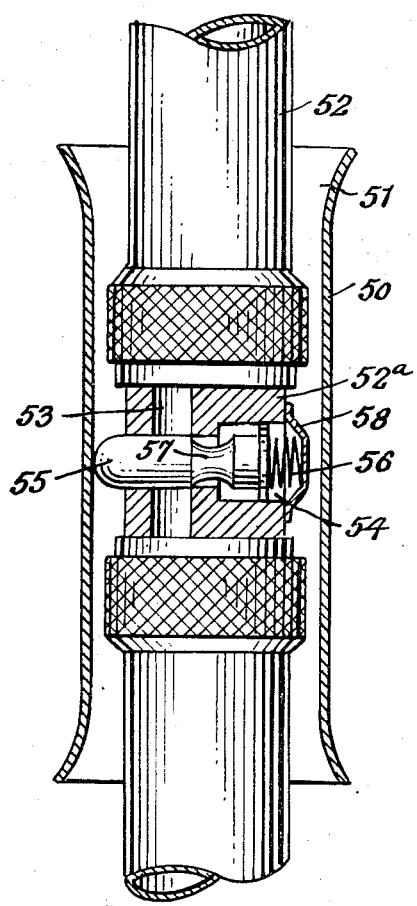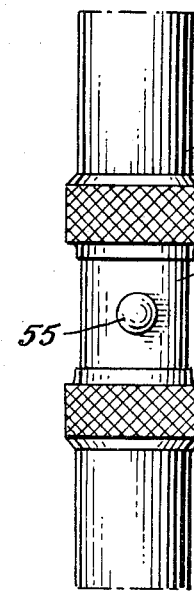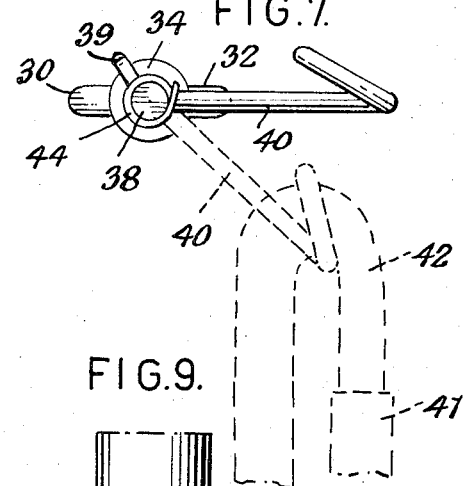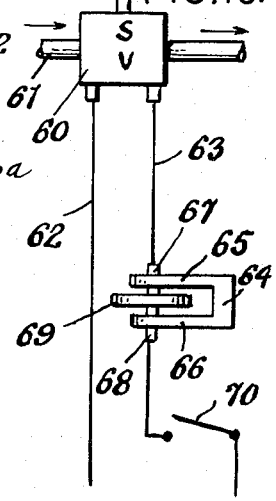

3,352,305
MULTIPLE FLUID DENTAL INSTRUMENT WITH
MIRROR ACTUATED VALVE
Hyman Freedman, 200 W. 58th St.,
New York, N.Y. 10019
Filed Sept. 22, 1964, Ser. No. 398,197
9 Claims. (Cl. 128—173.1)

This invention relates to dental instruments such as disclosed for example, in my Patent No. 3,001,288, dated Sept. 26, 1961, and one of the objects of the invention is to provide a simplified and improved means by which the control of one or more fluids, such as water and air, from a source of supply to the dental instrument such as a mirror, drill or the like, can be had without requiring material effort on the part of the operator, to enable him to secure valving for changes of air and water from the oral piece without movement of the fingers from their normal grip on the instrument enabling the operator to resist the patient's muscular tensing against the instrument.

It is an object of the invention to provide means to relieve and reduce the handling of switches and valves for obtaining water spray, air and light at the seat of dental operation; to simplify the control of fluids to or at a dental mirror or other tool of the kind requiring fluid for its propulsion or use.

It is an object of the invention to control the flow and selection of air or water to a dental tool; to provide means for shutting off the flow of a fluid to the tool by merely placing the tool upon a rest, and to perform other functions desirable or advantageous to the dentist.

It is an object of the invention to provide means by which an automatic intermittent spraying effect can be secured for a dental tool.

With these and other objects to be hereinafter set forth in view, I have devised the arrangement of parts to be described and more particularly pointed out in the claims appended hereto.

In the accompanying drawings, wherein illustrative embodiments of the invention are disclosed, FIG. 1 is a front elevational view of a dental mirror holder constructed according to the invention;

FIG. 2 is a side elevational view of the same;

FIG. 3 is a rear view of a portion of the mirror holder;

FIG. 4 is a sectional view through the water tube of the holder and the valve means therefor;

FIG. 5 is a vertical sectional view through the socket and clamping means for the stem of the mirror;

FIG. 6 is a top plan view of a valve and support for a dental mirror, drill or other dental tool;

FIG. 7 is an end view of the valve of FIG. 6 as seen from the left of FIG. 6;

FIG. 8 is a vertical sectional view of another tool support and shut-off valve therefor;

FIG. 9 is a view on a smaller scale of a part of the tool shown in FIG. 8 and

FIG. 10 is a diagrammatic view showing means for automatically supplying a water flow to a dental implement.

Referring to the drawings and more particularly to the construction shown in FIGS. 1 to 5 inclusive, there is therein shown a dental mirror 1 and its holder or handle. The holder or handle includes several parallel tubes such as a water supply tube 2 and an air supply tube 3. The air for the tube 3 may be supplied from a suitable source such as by the air supply used for the propulsion of the dental drill. The water supply can be provided from a bottle or other source, causing the water to flow through the tube 2. The tube 2 should be provided with an air vent adjacent to the source of water in order to prevent siphoning and thus provide an air passage between the source and a hole provided in the water line of the instrument. The tubes 2 and 3 pass through a ferrule 60 and connect to flexible tubing leading to the sources of supply in any known manner.

The tubes 2 and 3 communicate with the interior of a nozzle or spray head 4 which may, if desired, be constructed in the manner shown in my Patent No. 3,001,288 wherein the spray head or nozzle has a forwardly directed nozzle portion 5 provided with a spray outlet 6. The spray head is also provided with a spray outlet 7 directed upwardly toward the mirror 1. The spray outlet 6 thus directs a water spray toward the tooth being operated on while a jet from outlet 7 is directed toward the mirror to cleanse the same.

The mirror holder or handle includes a lamp socket 8 for holding a lamp 9, the current therefor from a suitable source being conveyed to the socket by wiring extended through a tube 10 forming a part of the mirror handle.

The water for spraying through the outlets or jets 6 and 7 is preferably suctionally drawn from a supply bottle which can contain, in addition to the water, a harmless detergent, the siphoning and atomizing of this fluid being attained by the air flow that is forced through the tube 3. The water tube 2 is provided near its upper end with a vent hole 11 through its walls and said hole is normally closed by a valve 12 which consists of a U-shaped plate embracing or straddling the water tube 2 over the hole 11. The valve 12 comprises an inner facing 13 (FIG. 4) which can be composed of rubber or other suitable sealing material and it is brought against the hole 11 to insure an airtight closure of the hole, when the valve 12 is in position over it.

The valve 12 is integrally formed at the upper end of an elongated blade or leaf 14 of springy nature, provided at its lower end with an integrally formed collar 15 fitted around the tubes 2 and 3 and held fixedly in position thereon by means of the screw 16 (FIG. 2).

This arrangement is such that the springiness of the blade or leaf 14 tends to normally hold the valve 12 over the vent hole 11 to thereby close the same and permit the flow of air through the tube 3 to enable it to suctionally affect the water flow through the tube 2 whereby said water will be sprayed or atomized out through the spray outlets 6 and 7.

Secured to the blade or leaf 14 is a downwardly-projecting lever or finger piece 17, the same being so disposed that by finger pressure imposed on it as indicated by the arrow in FIG. 2, the blade or leaf 14 will be sprung away from the tube 2, this causing the valve 12 to uncover the vent hole 11 and interrupting the suctional or atomizing effect of the air on the water, so that no water will be sprayed out of the outlets 6 and 7, but there will be merely a flow of air therefrom.

Mounted on the blade or leaf 14 above the finger piece 17 is the mirror holder which consists of a socket 18, which is provided with a number of longitudinal slits 19 in its wall, this slitted arrangement acting to divide the greater portion of the socket into a number of segments 19a which lends resilience to the wall of the socket. On the inside of the socket near the bottom of the same, one or more of the segments 19a of the socket is formed with threads 20 or other irregularities constituting gripping instrumentalities for engagement with threads 21 provided on the stem 22 of the mirror 1. The arrangement described is such that when the stem 22 of the mirror is thrust down into the socket 18, the threads 21 will engage the threads 20 on the inside of the socket and this will hold the mirror against longitudinal displacement except when the removal or rotation of the mirror is desired. In view of the fact that the threads 20 are on one or more of the segments 19a of the socket, the stem 22 of the mirror need not be rotated to fit the stem in the socket, but it can be inserted in the socket by direct axial push, an audible click being heard when the threads on the stem engage those in the socket.

The mirror can be locked against rotative movement by means of a locking sleeve 23 which is internally tapered as shown at 24 in FIG. 5 so that when it is manually pushed down over the upper portion of the socket 18 it will contract the segments 19a thereof around the stem 22 of the mirror, causing said segments to tightly frictionally grip the stem 22, holding it against both axial and rotative movement. The outside of the locking sleeve 23 may be knurled as shown at 23a to facilitate gripping the sleeve and moving it up or down on the socket.

In using the mirror it is often found necessary to reverse its position. That is to say, it is occasionally found desirable to position the mirror so that it faces away from the jets 6 and 7, or as shown in dotted lines in FIG. 2, as distinguished from its normal forwardly-directed position shown therein in full lines. This reversal of position is easily accomplished by merely pulling up the locking sleeve 23 from off the socket 18, thus releasing the clutching grip of the segments of the socket on the stem 22 of the mirror. The threaded connection between the stem of the mirror and the socket will then permit the rotative movement of the mirror with the stem as its axis, and the mirror can then be rotatively moved to position it as desired. When it is placed in the desired position the locking sleeve is then pressed down on the socket to cause it to embrace the segments thereof, compelling them to firmly grip the stem 22 and hold the mirror against both axial and rotative movement.

In FIGS. 1 and 2 of the drawing, the mirror holder 18 and its associated parts are shown as disposed along one side of the instrument there depicted. If desired, a similar holder may be provided along the opposite side of the instrument, permitting the mirror proper to be shifted when desired from one of the holders to the other to meet different examining and working requirements. The spray head is swivelled and can be swung to vertical when fitting the mirror in place in the required holder.

The socket 18 is firmly attached to the springy leaf 14 and is thus movable with it, and as a result the mirror can, when desired, be employed for flexing the leaf 14 to move the valve 12 and expose the vent hole 11. That is to say, the dentist can at any time during his work on the teeth of a patient, shut off the water flow from the spray outlets 6 and 7 without distracting the normal grip on the instrument and secure only an air flow, by merely touching the mirror against the teeth or gums of the patient. Thus, the mirror alone flexes away from the handle, thereby opening the valve. When this is done, the mirror will flex the leaf 14 to an extent to uncover the vent hole 11 and thus will interrupt the water flow. The water flow will immediately be resumed when the pressure against the mirror is discontinued and the valve 12 is closed over the hole 11.

It will be apparent from the foregoing that an arrangement is provided which can greatly expedite the work of the dentist by enabling the control of the air and water flow to be simplified and without requiring special finger manipulation that would tend to weaken the grip on the instrument. By the described arrangement the valve 12 can be opened either by the pressure of the mirror against the teeth or gums or by the finger pressure imposed on the finger piece 17, thus providing dual control for the valve 12.

In FIGS. 6 and 7 is shown a control means for the flow of water or air to a mirror, drill or other dental tool of the kind requiring a flow of air. The tube shown at 30 is connected to a source of the air by flexible tubing 31 and the tube shown at 32 leads through tubing 33 to the dental instrument to which the air is to be conveyed. Interposed between the tubes 30 and 32 is a valve housing 34 containing a rotative plug valve 35 having a transverse hole 36 which, in the normal or open position of the valve, as shown in FIG. 6, registers with the passage 37 through the housing to thereby establish communication between the tubes 30 and 32 and permit the flow of air from tube 30 to tube 32. This open position of the valve is the normal position of the same. When the air flows through, the water is induced through the water tube 2.

Extending axially from the plug 35 of the valve is a stem 38 carrying a radially-extending offset arm 39 constituting a stop or abutment employed to limit the rotative movement of the plug. Also extending radially from the stem 38 is a hook-shaped supporting arm 40 that is employed as a hanger for a dental tool, such as the mirror herein described, a drill or any other tool using air or water for its operation or use during its work. A part of such a tool is diagrammatically illustrated at 41 in FIG. 7 wherein its flexibly formed casing 42 containing its water and air supply tubes, or either of them, is shown draped over the arm 40. The arm 40 is normally biased by a torsional spring 44 to cause the valve to remain open, as shown in FIG. 6 as long as the tool is not hung on the arm 40. When the tool is hung on the arm as shown for example in FIG. 7, the weight of the tool and its casing 42 will exert a downward gravitational pull on the arm 40 causing it to descend and rotate the valve plug to disalign the hole 36 from the passage 37 and thus close the valve and prevent the flow of air from tube 30 to tube 32. Whenever the tool 41 is lifted from the arm 40, the spring 44 will restore the valve to open position so that the tool, then in the hand of the dentist, will be instantly supplied with the required air or water. The valve may be suitably fixedly mounted on a dental chair or elsewhere for the convenience of the dentist.

In FIG. 8 is shown another control device for the regulation of the flow of air or water to a dental tool, such as the mirror herein described, or to a drill or other tool requiring a fluid for its operation or use. This control device includes a suitably-mounted sleeve 50, which may be split lengthwise and flared at both of its ends, or at least at its upper end as shown at 51. This flared end facilitates the entry into the tube or sleeve 50 of the dental tool, a portion of which is indicated at 52. The tool includes a valve chamber 52a provided with a longitudinal fluid passage 53 which communicates with tubes contained within the tool for the passage of air or water or both according to the necessities of the particular tool.

Extending transversely through the valve chamber 52a and crossing the passage 53 is a valve port 54 in which a slidable valve of the plunger type 55 is mounted. The valve 55 is normally biased by a coil spring 56 to an open position when the tool is in use or is out of the sleeve 50, at which time the annular perforated groove 57 of the valve registers with the passage 53 and permits the flow of air therethrough and through the connected air tube or passage extending through the body of the tool. A cap 58 closes the chamber in which the spring 56 is confined, the cap forming an abutment for one end of the spring.

The sleeve 50 may be suitably stationarily mounted at a location convenient to the dentist. When the dental tool is in use or is out of the sleeve 50, the spring 56, pressing on the end of the valve 55 will urge the groove 57 into register with the passage 53 and thus permit the flow of fluid to the tool. When the tool is not being used, it is inserted within the sleeve 50 and as it enters the sleeve the inner wall surface of the sleeve will engage against the end of the valve 55, forcing the same to closed position against the bias of the spring 56. Thus, as long as the tool is positioned within the sleeve 50 the supply of air to the tool will be shut off.

In FIG. 8 the tool and sleeve are shown enlarged for clarity in illustration, with the tool somewhat loosely fitting within the sleeve. In actual practice the fit of the tool within the sleeve may be a relatively close one and the sleeve can be used as the supporting means for the tool in which the tool can be hung up or suspended when not in use, and with the supply of fluid to the tool shut off by the mere placement of the tool within the sleeve 50.

In using certain dental implements and particularly those in which a water spray is employed, the dentist finds it desirable to utilize an intermittent spray and this is often controlled by a solenoid valve operated by a foot switch. By means of the arrangement shown in FIG. 10, the spraying can be intermittently and automatically obtained without requiring manual switch operation. Therein a solenoid valve is shown at 60, the same being provided in a water line 61, leading from a source of water under pressure and connecting to the implement in which the water spray is used. The electrical wires 62, 63 lead from a source of current and are connected to the solenoid valve which is closed and opened electrically to permit the flow of water to the implement as indicated by the arrows or intermittently shut off the flow. Interposed in the line 63 is an intermittent interrupter which includes a U-shaped member 64 having flexible arms 65, 66 which are normally springably urged toward one another to close circuit between their respective contacts 67, 68.

Inserted between the arms 65 and 66 is an intermittent thermostatic switching device 69 generally known as a flasher button and commonly used for intermittently closing circuit to a lamp to create a flashing effect. There is also interposed in the lead 63, a foot switch 70 which can, if desired be of the treadle type.

When it is desired to control the intermittent flow of water solely by foot operation, the button 69 is withdrawn from between the arms 65 and 66, thus bringing the contacts 67 and 68 together. Then by closing the foot switch 70 current will flow to the solenoid valve 60 which will open and permit the flow of water through line 61 to the dental implement. By opening and closing the foot switch 70 at the required times, intermittent spraying of the water will take place.

When it is desired to provide for an intermittent spraying effect automatically and at regular intervals, the flasher button 69 is inserted between the arms 65 and 66 and the switch 70 is closed and maintained in its closed position whereupon the button 69 will, at regular intervals, close and open circuit to the valve 60 permitting the same to allow intermittent flow of water to the dental instrument. The intermittent flow of water for spraying purposes can thus be had by the dentist without requiring attention on his part, yet he can control the flow whenever desired by the operation of the switch 70.

Having thus described embodiments of the invention, it is obvious that the same is not restricted thereto, but is broad enough to cover all structures coming within the scope of the annexed claims.

What I claim is:

1. A dental tool having a water tube provided with a vent opening, a spray head to which air and the water from the water tube is supplied for atomization of the water from said water tube, a valve of a springy material movably mounted thereover and a mirror attached to the valve and caused to open the valve when pressure is imposed on the mirror.

2. A dental tool having an air tube and a liquid tube, a spray head into which the tubes are connected, the air flowing through the air tube being effective to atomize the liquid, the liquid tube having a vent opening, a spring-biased valve normally closing said opening, the valve including a leaf spring having an extended finger piece by which the spring is flexed to cause the valve to be moved to open position, a socket carried by the leaf spring, a mirror having a stem inserted in the socket, and means for clampingly contracting the socket around the stem to hold the mirror against rotative and axial displacement.

3. A dental tool having a water tube, an atomizing spray head to which the water tube is connected, a vent opening in the tube, a spring carrying a valve to close said vent opening, a socket carried by the spring, and a mirror supported by said socket, the spring being flexed away from the vent opening by pressure imposed on the mirror.

4. A dental tool comprising, a handle portion including air and water supply tubes terminating in a spray head, one of the tubes having a vent opening, a leaf spring extending along one of the tubes and anchored at one end thereto, the opposite end of the leaf spring having a channel part embracing the tube with the vent opening and closing said opening, a finger piece attached to the leaf spring and by which the spring can be manually flexed to move its channed part away from the vent opening, a socket mounted on the leaf spring, the socket being split to divide it into segments, a mirror having a threaded stem entrant into the socket, at least one of the segments being internally threaded to engage the threads on the stem, a sleeve fitted around the outside of the socket, the sleeve being internally tapered so that when it is axially forced on the socket it will draw the segments together around the stem and cause the segments to frictionally grip the stem.

5. A dental tool having a spray head for air and water and adapted to liquid-spray a dental seat of operation and a mirror, tubes leading into said spray head to carry water thereinto for the spraying operation, one of the tubes being a water supply tube and being provided with a vent opening, a movable springy valve normally closing the opening, a mirror carried by the valve and located in a position to be sprayed by the spray head, the valve being capable of flexure away from the opening to uncover said opening by pressure imposed on the mirror and thereby preventing the flow of water through the water tube to the spray head.

6. In a dental tool, an atomizing spray head for directing water toward a seat of dental operations and also toward a dental mirror, tubes for conveying air and water respectively into the head, a valve operative on the water-conveying tube, a socket split into segments and carried by the valve, a mirror having a projecting stem fitted into the socket, means on the stem for interengagement with elements on the side of the socket, and an internally tapered sleeve slidably fitted around the socket to contract the segments of the same around the stem to frictionally hold the stem against longitudinal and rotative displacement.

7. In a dental tool according to claim 6, wherein the fluid-conveying tube has a vent hole, the valve adapted for closing the hole, a leaf spring carrying the valve, the socket being mounted on the spring and the mirror being positioned so that pressure imposed on the mirror will flex the spring and cause the valve to uncover the vent hole.

8. In a dental tool, an atomizing spray head for directing water against a dental mirror, a water supply tube leading to the spray head, a valve operative on the water supply tube, a mirror holder carried by said valve, said holder having a split socket provided with internal threads, a mirror having a stem formed with threads, the stem being received in the socket with its threads engaging those in the socket, a sleeve fitted around the socket, the sleeve having a tapered interior for compressing the socket and causing it to frictionally grip the stem of the mirror and thereby hold the mirror in position on the valve and to be srayed by the water emanating from the spray head.

9. A dental tool having outlets for air and water and adapted to liquid-spray a dental seat of operation and a mirror, tubes leading into said spray head to carry water thereinto for the spraying operation, one of the tubes being a water supply tube and being provided with a vent opening, a movable springy valve normally closing the opening, a mirror carried by the valve and located in a position to be sprayed by the spray head, the valve being capable of flexure away from the opening to uncover said opening by pressure imposed on the mirror and thereby preventing the flow of water through the water tube to the spray head, the valve carrying the mirror being provided with a finger piece so that the valve can be moved to vent-uncovering position either by pressure imposed on the mirror or by finger pressure imposed on the finger piece.

References Cited

UNITED STATES PATENTS

| | | | |
|---|---|---|---|
| 300,524 | 6/1884 | Starr | 128—11 |
| 1,201,550 | 10/1916 | Brush | 128—11 |
| 2,984,909 | 5/1961 | Johnston | 32—69 |
| 3,001,288 | 9/1961 | Freedman | 32—69 |

RICHARD A. GAUDET, *Primary Examiner.*

J. W. HINEY, *Assistant Examiner.*